UNITED STATES PATENT OFFICE.

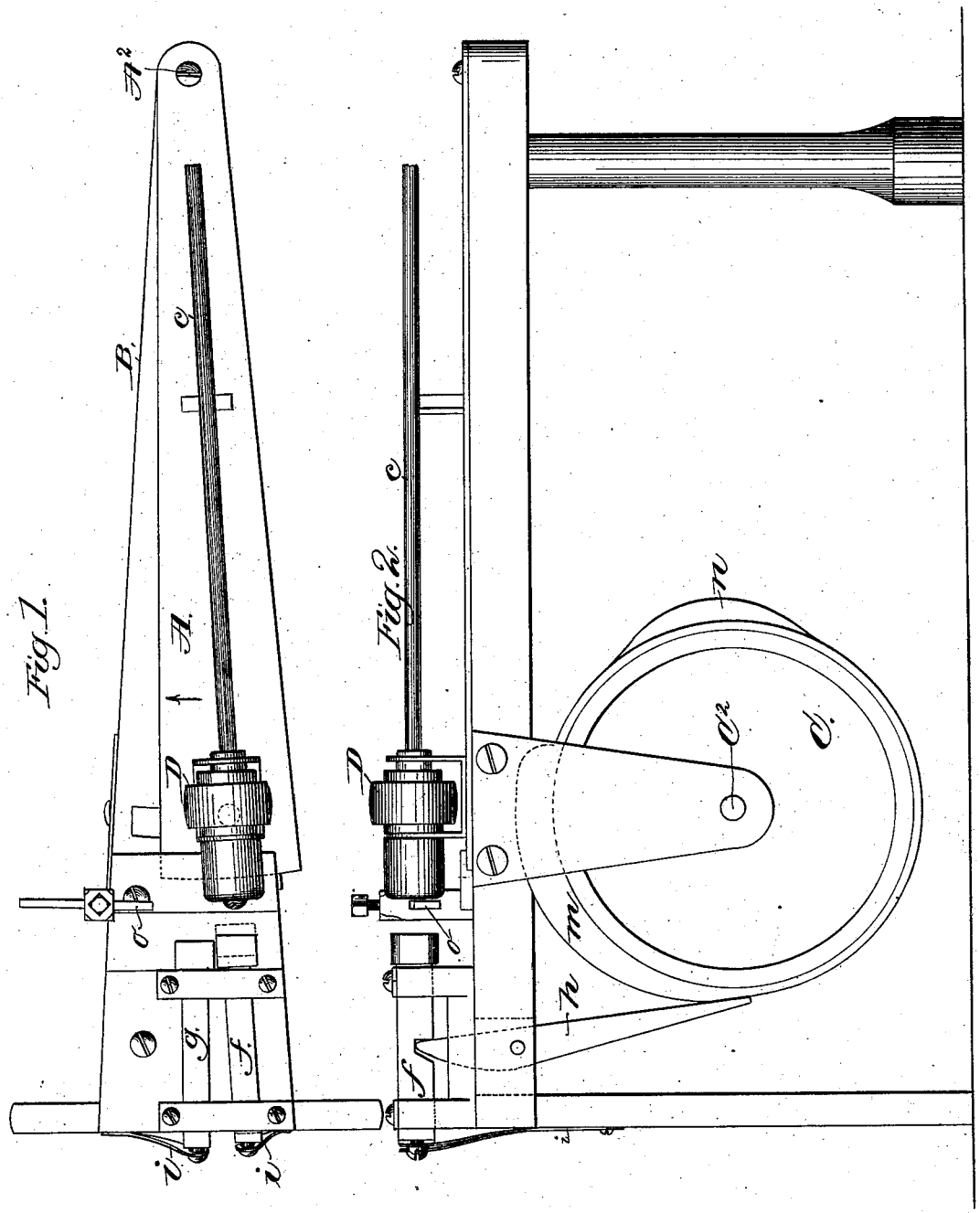

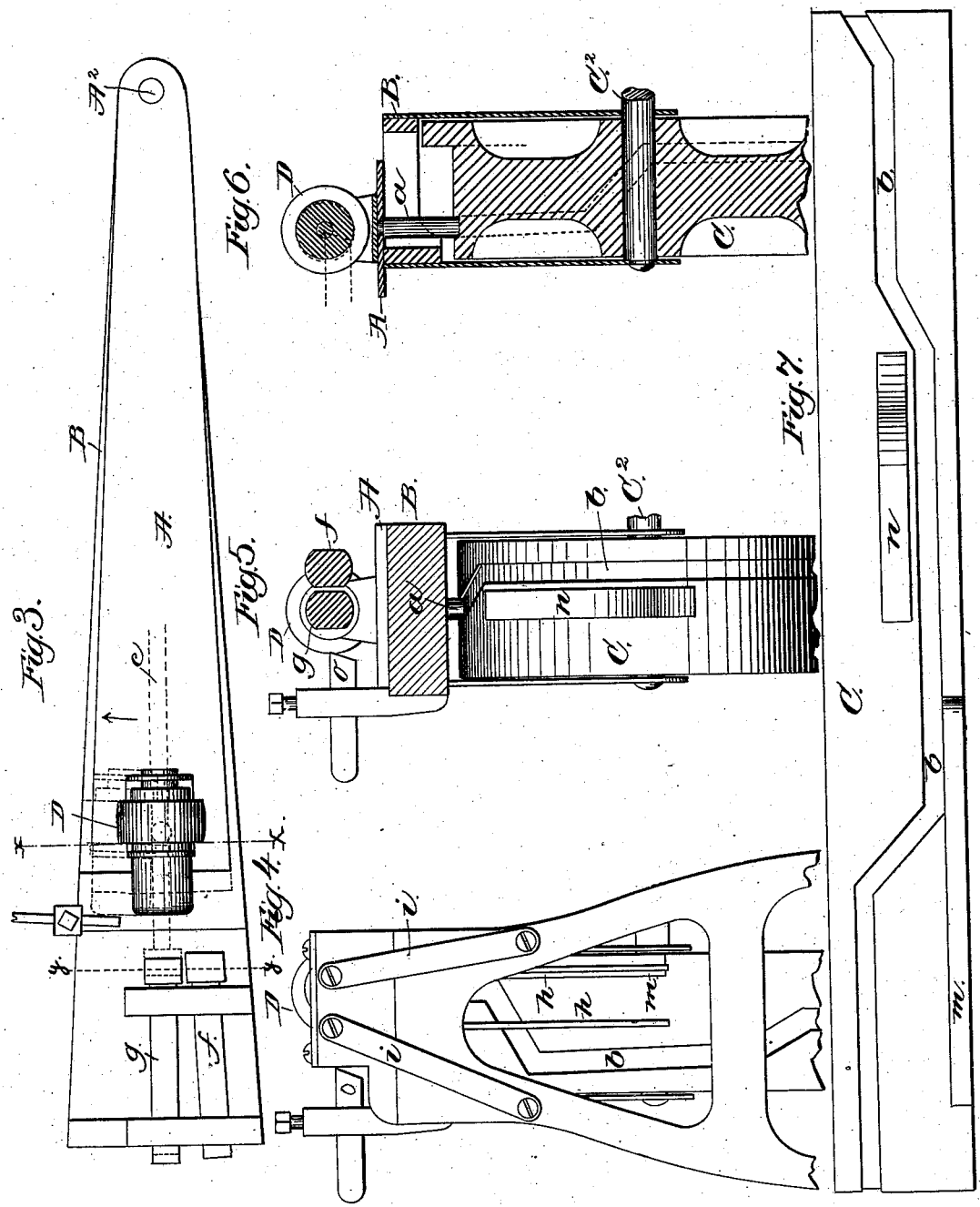

CHARLES F. ROPER, OF BOSTON, MASSACHUSETTS.

METAL-SCREW MACHINE.

SPECIFICATION forming part of Letters Patent No. 292,683, dated January 29, 1884.

Application filed April 6, 1882. (No model.)

*To all whom it may concern:*

Be it known that I, CHARLES F. ROPER, of Boston, county of Suffolk, State of Massachusetts, have invented an Improvement in Machines for Making Metal Screws, of which the following description, in connection with the accompanying drawings, is a specification.

My invention in machines for making metal screws consists in an organized machine containing radially-sliding reducing and threading tools, and a vibrating radius-bar provided with a rod-rotating chuck mounted thereon, the center of motion of the said radius-bar being the center from which the tool-holding slides radiate. In this my present invention the rod from which the screws are to be formed is placed within the revolving chuck mounted in bearings on a radius-bar, which is vibrated for the proper distance to place the rod first in line with a reducing-tool on a tool-carrier held in bearings, and adapted to be reciprocated in a radial line with relation to the center of motion of the said radius-bar, and as soon as the rod is reduced at its end the radius-bar is further vibrated about its center, and the chuck places the reduced end of the rod opposite the threading-tool connected with a tool-carrier, also made movable radially toward and from the center of motion of the said radius-bar. The blank yet connected with the rod having been threaded, the direction of rotation of the chuck and rod will be reversed, and the threading-tool carrier will be drawn backward. After this, further movement of the radius-bar and chuck in the arc of a circle will cause the rod to be pressed against the cutting-off or parting tool, when the blank, properly threaded, will be cut off.

Figure 1 represents in plan view a sufficient portion of a metal-screw machine to illustrate my invention: Fig. 2, a side elevation of Fig. 1; Fig. 3, a plan view, with the radius-bar and chuck in a different position; Fig. 4, a left-hand end view of Fig. 2; Fig. 5, a section of Fig. 3 on the line $y\ y$; Fig. 6, a section thereof on the line $x\ x$; and Fig. 7, a developed view of the cam which moves the radius-bar.

The radius-bar A, pivoted at $A^2$ upon the frame-work B, has a pin or stud, $a$, (see Figs. 5 and 6,) which enters a cam-groove, $b$, on the periphery of the hub C on the shaft $C^2$, which in practice will have on it a belt-pulley to be driven by a belt from a suitable counter-shaft. The cam-groove $b$ is of such shape as to move the radius-bar A intermittingly about its center $A^2$, and place the rod $c$, held in the revolving chuck D, in front of one of the tool-carriers, and hold the radius-bar and chuck in position while the chuck is rotated to rotate the rod for the tool opposite it to perform its work. This chuck and its parts to grasp and release the tool may be of any usual construction; but in practice I prefer to employ devices therefor such as shown in my application No. 30,539, filed April 11, 1881. The tool-carrier $f$, at its front end, will be provided with any usual reducing-tool. This carrier is guided in suitable bearings and adapted to slide in a radial line with relation to the center of motion, $A^2$, of the radius-bar A. The tool-carrier $g$, at its front end, will be provided with any usual threading-tool. This slide $g$ is also so supported in its bearings as to slide only in a radial direction with relation to the said center $A^2$. Each tool-carrier is moved backward by a suitable spring, $i$, and forward to perform work by a suitable lever, $h$. The lever which moves the tool-carrier $f$ forward is acted upon by a cam, $m$, and the lever which moves forward the tool-carrier $g$ by a cam, $n$. The end of the rod having been reduced to form a blank for a screw, and the said blank having been threaded by the tool of the tool-carrier $g$, the further movement of the radius-bar in the direction of the arrow near it will place the blank against the cutting-off or parting tool $o$, fixed with relation to the frame B, which will sever the threaded blank from the rod. To withdraw the threading-tool from the threaded blank, the chuck will be reversed as to its direction of rotation, turning the rod in a reverse direction by any suitable and well-known means.

The radius-bar and chuck may be so placed as to permit the gravity of the rod to effect its feed; or I may employ any well-known feeding device common to this class of screw-machines.

I claim—

1. A pivoted vibrating radius-bar and revolving rod-rotating chuck carried thereby, combined with one or more tool-holders made movable in lines radiating from the center of motion of the said radius-bar, to operate substantially as described.

2. The pivoted vibrating radius-bar, its revolving rod-rotating chuck, and two or more tool-carrying slides made movable in lines radiating from the center of motion of the radius-bar, combined with a fixed cutting-off or parting tool, substantially as and for the purpose described.

In testimony whereof I have signed my name to this specification in the presence of two subscribing witnesses.

CHARLES F. ROPER.

Witnesses:
G. W. GREGORY,
B. J. NOYES.